June 10, 1958 J. E. RICHARDSON 2,838,692

PULSE GENERATOR

Filed July 11, 1955

INVENTOR.
JOHN E. RICHARDSON

BY Ellsworth R. Roston

ATTORNEY

United States Patent Office 2,838,692

Patented June 10, 1958

2,838,692

PULSE GENERATOR

John E. Richardson, Los Angeles, Calif., assignor to The Magnavox Company, Los Angeles, Calif., a corporation of Delaware Application July 11, 1955, Serial No. 521,174

10 Claims. (Cl. 307—132)

This invention relates to a pulse generator and more particularly to a generator for producing a single output pulse upon each closure of a switch.

In recent years, pulse techniques have become important in a number of different fields. For example, pulses are used in various types of radar equipment to provide indications of varions quantities such as the range and bearing of a target. Pulse techniques are also used in digital computers and data processing systems to provide solutions of complex mathematical and business problems.

Quite often when pulse techniques are being used, it is desirable to generate a single pulse every time that a certain phenomenon occurs. A single pulse must be generated without any overshoots in voltage in a direction opposite to the polarity of the pulse. For example, in digital computers a negative overshoot of a positive pulse is undesirable because such a negative pulse might indicate a binary valus such as "0" when a positive pulse indicates a binary value such as "1." Until now it has been difficult to provide circuitry for producing only a single pulse with no overshoots in an opposite direction every time that a control phenomenon occurs.

This invention provides a generator for producing a single pulse every time that a switch is actuated by a cam. In addition to the switch, the circuit includes a unidirectional member such as a diode, a charging member such as a capacitance and a voltage source. These members are connected in a circuit with the switch in a first position of the switch to produce a charging of the capacitance. A load is also included to form a circuit with the capacitance and the switch in a second position of the switch for producing a discharge of the capacitance through the load.

A magnetic member having a saturable core is connected to the load to produce a saturation of the core upon each discharge of the capacitance. By using a magnetic member with a saturable core, the magnetic member inhibits the passage of any signals resulting from overshoots in each individual pulse produced across the load. In this way, the magnetic member produces a single output pulse upon each discharge of the capacitance through the load.

An object of this invention is to provide a generator for producing a single output pulse upon each occurrence of a phenomenon such as the actuation of a switch.

Another object is to provide a generator for producing signals at a particular frequency in accordance with the occurrence of a cyclic phenomenon, a single signal being produced upon each occurrence of the phenomenon.

A further object is to provide a generator which uses techniques of magnetic core saturation to generate a single pulse upon each occurrence of a cyclic phenomenon.

Still another object is to provide a generator using techniques of magnetic core saturation and operative on a push-pull basis to alternately produce positive and negative pulses.

A still further object is to provide a generator for alternately producing positive pulses having first characteristics and negative pulses having second characteristics different from the first characteristics.

Other objects and advantages will be apparent from a detailed description of the invention and from the appended drawings and claims.

Figure 1:
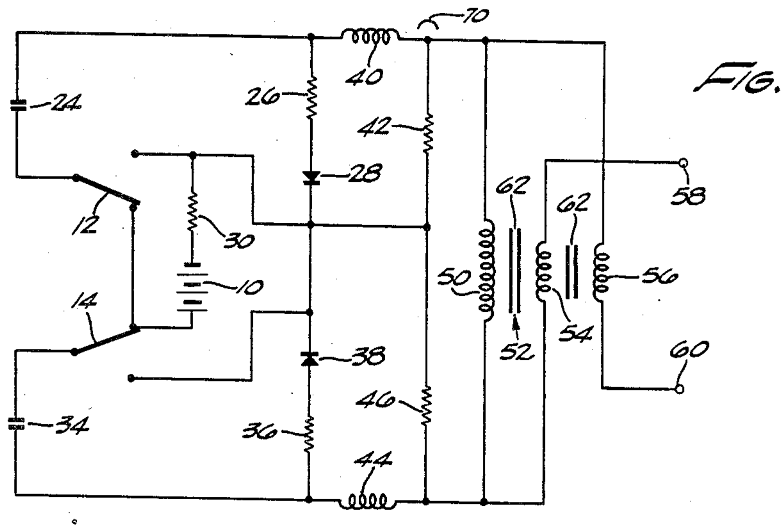
Figure 1 is a circuit diagram somewhat schematically illustrating a pulse generator constituting one embodiment of the invention.
Figure 2:
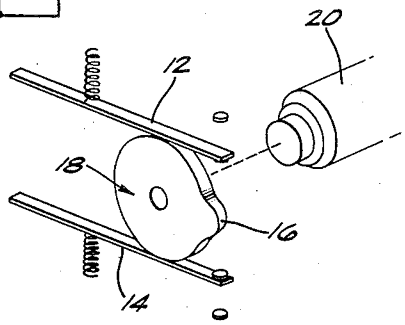
Figure 2 is an enlarged perspective view of certain switches forming a part of the embodiment shown in Figure 1 and also includes certain members such as a motor and a cam for actuating the switches in a particular time relationship.

In the embodiment of the invention shown in Figure 1, a pulse generator is provided which includes a suitable source of direct voltage such as a battery 10. The positive terminal of the battery 10 is connected in Figure 1 to the lower stationary contact of a switch 12 and the upper stationary contact of a switch 14. As seen in Figures 1 and 2, each of the switches 12 and 14 is of a single-pole, double-throw construction.

The switches 12 and 14 have movable contacts which are spring-loaded to produce engagement between the movable contacts and certain stationary contacts of the switches. These are the stationary contacts which are connected to the positive terminal of the battery 10. The movable contact of the switch 12 is pivotable into engagement with the upper stationary contact of the switch 12 upon actuation by a lobe 16 (Figure 2) on a rotary cam 18. The cam 18 is adapted to be driven at a particular speed by a suitable motor 20. Similarly, the movable contact of the switch 14 is pivotable by the cam lobe 16 into engagement with the lower stationary contact of the switch. For reasons which will be described in detail subsequently, the switch 14 is displaced by substantially 180° from the switch 12 along the annular periphery of the cam 18.

A connection is made from the movable contact of the switch 12 to a suitable charging member such as a capacitance 24 (Figure 1). The capacitance 24 is provided with a suitable value such as approximately 4 microfarads. The capacitance 24 is in series with a resistance 26 and a unidirectional member such as a diode 28, the plate of which has a common connection with the resistance. The cathode of the diode 28 is connected to the upper stationary contact of the switch 12 and to one terminal of a resistance 30, the other terminal of which has a common connection with the negative terminal of the battery 10. The resistance 30 has a relatively low value for reasons which will be described in detail subsequently.

In like manner, a charging member such as a capacitance 34, a resistance 36 and a unidirectional member such as a diode 38 are in series between the movable and lower stationary contacts of the switch 14. The capacitance 34, the resistance 36 and the diode 38 have characteristics corresponding respectively to those of the capacitance 24, the resistance 26 and the diode 28. In addition to being connected to the lower stationary contact of the switch 14, the cathode of the diode 38 is connected to the cathode of the diode 28.

An inductance 40 and a resistance 42 are in series with each other and in parallel with the series branch formed by the resistance 26 and the diode 28. The inductance 40 and the resistance 42 may serve as one type of load. The inductance 40 has a suitable value such as approximately 1 henry and the resistance 42 has a suitable value such as approximately 50 ohms. Similarly, an inductance 44 and a resistance 46 are connected in series with each other across the series branch formed by the resistance 36 and the diode 38. The inductance 44 and the resistance 46 may serve as a second load. The characteristics of the inductance 44 and the resistance 46 correspond respectively to those of the inductance 40 and the resistance 42. The resistances 42 and 46 have a common terminal.

A primary winding 50 is connected at one end to the common terminal between the inductance 40 and the resistance 42 and at the other end to the common terminal between the inductance 44 and the resistance 46. The primary winding 50 is included in a transformer which is generally indicated at 52 and which is provided with a pair of secondary windings 54 and 56. The windings 54 and 56 have similar numbers of turns and similar characteristics and a number of turns substantially half as great as the number of turns in the winding 50. The winding 54 is connected at one end to the common terminal between the inductance 44 and the resistance 46. The winding 56 is connected at the opposite end to the common terminal between the inductance 40 and the resistance 42. The other ends of the windings 54 and 56 are respectively connected to output terminals 58 and 60.

The windings 50, 54 and 56 of the transformer 52 are wound on a core having saturable magnetic characteristics. For example, the core 62 may be made from a ferrite material designated as S1, S2 or S3 by the General Ceramic and Steatite Corporation of Keasbey, New Jersey. This material is a ferromagnetic ceramic molded from powdered particles. The core 12 may be provided with a toroidal shape so as to have a complete continuity with no air gaps, or it may be provided with any other suitable shape.

As previously described, the switch 12 is spring-loaded so that the movable contact of the switch normally engages the lower stationary contact of the switch. With the movable contact in this position, a continuous circuit is established which includes the battery 10, the lower stationary and movable contacts of the switch 12, the capacitance 24, the resistance 26, the diode 28 and the resistance 30. A current flows through this continuous circuit and charges the capacitance 24 to produce a positive voltage on the lower terminal of the capacitance as seen in Figure 1. Because of the particular values of the resistances 26 and 30, the capacitance 24 becomes charged to a relatively high voltage in each revolution of the cam 18. However, by a proper choice in values of the resistances 26 and 30, the capacitance 24 does not become charged so fast as to produce violent surges of current.

In each rotational cycle of the cam 18, the lobe 16 on the cam actuates the movable contact of the switch 12 into engagement with the upper stationary contact of the switch. This produces an interruption in the charging circuit described in the previous paragraph and prevents the capacitance 24 from being further charged. The capacitance also is unable to discharge through a circuit including the diode 28 because of the high impedance presented by the diode to the flow of current from the cathode to the plate of the diode.

When the movable contact of the switch 12 engages the upper stationary contact of the switch, a continuous circuit is established which includes the capacitance 24, the movable and upper stationary contacts of the switch 12, the resistance 42 and the inductance 40. Upon the establishment of this continuous circuit, the capacitance 24 discharges through the resistance 42 and the inductance 40. The discharge occurs on a somewhat resonant basis because of the inclusion of the inductance 40. This causes the capacitance to discharge in a pulse having a relatively great maximum amplitude and a wave form similar to that indicated at 70 in Figure 1. By providing proper values for the capacitance 24 and the inductance 40, the pulse 70 is formed in a time equal to or somewhat less than the time required for the cam 18 to rotate through one half of a revolution. The reason for this will be described in detail subsequently.

The discharge of the capacitance through the resistance 42 and the inductance 40 causes energy to be stored in the inductance 40. This energy is released when the discharge current from the capacitance 40 starts the decrease or becomes interrupted. The release of the energy stored in the inductance 40 is not effective in producing a flow of current through the diode 28 and the resistance 26 because of the high impedance presented by the diode from the cathode to the plate. Current also cannot flow from the inductance 40 through the capacitance 24 because of the return of the movable contact of the switch 12 to the lower stationary contact of the switch after the movement of the lobe 16 past the movable contact of the switch.

In this way, current cannot flow through the resistance 42 to produce a pulse having an opposite polarity to that produced by the discharge of the capacitance 24. As will be seen, the only path available for the release of energy from the inductance 40 is through the primary winding 50 of the transformer 52. As will be described in detail hereinafter, any release of energy through the primary winding 50 is not capable of producing an output signal in the transformer.

In order to understand the contribution of the transformer 52 to the pulse generator, the magnetic characteristics of the transformer must first be described. Since the transformer 52 includes the saturable core 62, the application of ampere-turns to the core by the flow of current through one of the transformer windings causes the core to become saturated. A positive saturation of the core 62 is indicated at 72 in Figure 3.

When the core 62 becomes saturated with flux of a positive polarity, a further application of ampere-turns to the core produces no further appreciable increase in flux in the core. This is indicated at 74 in Figure 3. Since no further flux of any appreciable intensity is produced in the core 62, voltages are not induced in the secondary windings 54 and 56 upon the imposition of ampere-turns to the primary winding 50.

Figure 3:
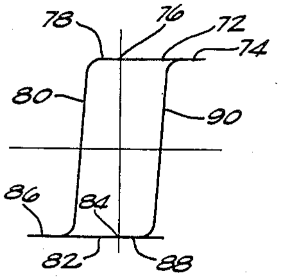
Figure 3 is a curve illustrating certain operating characteristics of a saturable-core magnetic member forming an important part of the embodiment shown in Figure 1.

Upon the interruption of the positive ampere-turns applied to the core 62, the flux in the core 62 remains at a saturating intensity as indicated at 76 in Figure 3. The introduction of a moderate amount of negative ampere turns to the core 62 also causes the core to remain at a saturating intensity, as indicated at 78 in Figure 3. Since the flux in the core 62 does not change appreciably when the core is operating in the region 78, no appreciable voltages are induced in the secondary windings 54 and 56. Furthermore, the flux in the core returns to substantially the level 76 upon the interruption of the ampere-turns.

An increase in the amount of negative ampere-turns causes the core to operate in a dynamic region 80. In this region, a relatively small change in ampere-turns applied to the core 62 produces a relatively great change in the core flux. Because of this, a relatively small change in current causes a relatively large voltage to be induced in the secondary windings 54 and 56.

The continued application of negative ampere-turns causes the core 62 to become saturated with negative flux as indicated at 82 in Figure 3. When the core 62 becomes saturated with flux of negative polarity, the flux remains in the core even after the interruption of the negative ampere-turns, as indicated at 84 in Figure 3. The flux remains at a saturating intensity even upon the introduction of an increased amount of negative ampere-turns, as indicated at 86 in Figure 3, or upon the introduction of a moderate amount of positive ampere-turns, as indicated at 88 in Figure 3. This occurs in a manner similar to that described above for the positive flux of saturating intensity.

An increase in the amount of positive ampere-turns applied to the core 62 causes the core to operate in a dynamic region indicated at 90 in Figure 3. In this region, a small change in ampere-turns produces a large change in flux so that a signal of relatively high amplitude is induced in the secondary windings 54 and 56. Continued application of positive ampere-turns to the core 62 causes the core to become saturated with flux of a positive polarity, as indicated at 72 in Figure 3 and described fully above.

As described fully above, the capacitance 24 discharges through a circuit including the capacitance, the switch 12, the resistance 42 and the inductance 40 when the movable contact of the switch engages the upper stationary contact of the switch. The flow of current through the resistance 42 produces a voltage drop across the resistance. Since the resistance 46 and the primary winding 50 are in series across the resistance 42, current flows through these members at the same time that it flows through the resistance 42.

Figure 4:
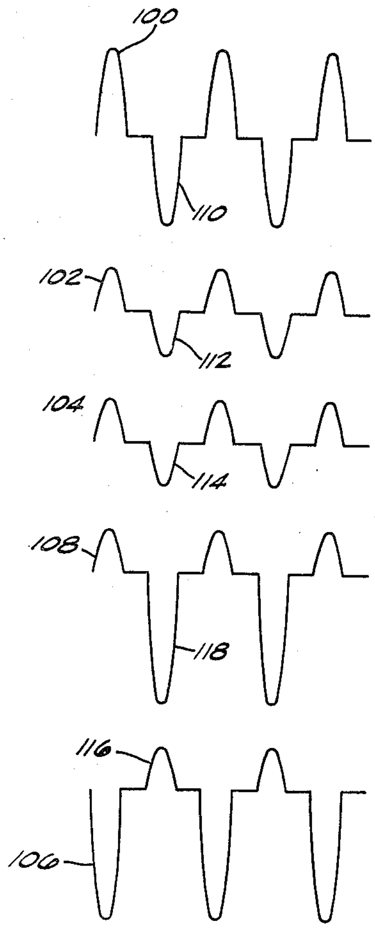
Figure 4 illustrates curves of voltages at strategic terminals in the embodiment shown in Figure 1.

The current flowing through the resistance 46 and the primary winding 50 is of a sufficient intensity to change the flux in the core 62 from a saturating flux of a negative intensity to saturating flux of a positive intensity. This causes a signal to be produced in the primary winding 50 while the core 62 is operating in the dynamic region 90. The signal produced in the primary winding 50 is indicated at 100 in Figure 4. After the core 62 has passed through the dynamic region 90 into the saturating region 72, no further voltage of any appreciable amplitude is developed across the primary winding. This causes the currents flowing through the resistances 42 and 46 to be substantially equal such that voltages of equal amplitude are developed across the resistances.

The production of the signal 100 in the primary winding 50 causes signals to be niduced in the secondary windings 54 and 56. These signals have wave forms corresponding substantially to that of the signal 100 in Figure 4. However, the peak amplitudes of the signals induced in the windings 54 and 56 are substantially only half as great as that of the signal 100 because of the turns ratios between the different windings. The signals induced in the windings 54 and 56 are respectively indicated at 102 and 104 in Figure 4. The polarities of the signals 102 and 104 correspond to the polarity of the signal 100.

By connecting like terminals of the windings 50 and 54, the signals 100 and 102 are effectively added at the common terminal between the windings. This causes a positive voltage having a peak amplitude substantially three times as great as that of the signal 102 to be developed at the common terminal between the windings 50 and 54. Since a positive signal is developed at the common terminal, a negative signal of similar amplitude and characteristics is developed at the output terminal 58. This negative signal is indicated at 106 in Figure 4. At the same time, the signal 104 is introduced to the output terminal 60 to develop a positive voltage having a peak amplitude substantially one third as great as the peak amplitude of the negative signal 106. The signal produced at the output terminal 60 is indicated at 108 in Figure 4.

Since the core 62 is operating in the region of positive saturation after the discharge of the capacitance 24, it is not affected by the introduction of a moderate amount of negative ampere-turns to the core. This has been described above and indicated at 78 in Figure 3. For this reason, no appreciable flux is produced in the core 62 by any overshoot of voltage in a negative direction after the discharge of the capacitance 24. This overshoot may be produced in part by the release of stored energy in the inductance 40 or may be produced by other transient phenomena in the pulse generator. In this way, it will be seen that it is desirable to use in the transformer 52 a core material having rectangular hysteresis characteristics similar to the characteristics shown in Figure 3. By using such a core material, any tendency for the pulse generator shown in Figure 1 to produce output signals having overshoots is inhibited.

In like manner, the capacitance 34 becomes charged when the movable contact of the switch 14 engages the upper stationary contact of the switch. The capacitance 34 becomes charged through a circuit including the battery 10, the upper stationary and movable contacts of the switch 14, the capacitance 34, the resistance 36 and the diode 38. When the lobe 16 on the cam 18 thereafter actuates the movable contact of the switch 14 into engagement with the lower stationary contact of the switch, the capacitance 34 discharges through a circuit including the capacitance, the inductance 44, the resistance 46 and the lower stationary and movable contacts of the switch. This occurs approximately one half cycle after the discharge of the capacitance 24 because of the disposition of the movable contacts in the switches 12 and 14 relative to the lobe 16 on the cam 18.

The discharge of the capacitance 34 through the resistance 46 causes a signal to be developed across the resistance. This signal is also produced across the series branch formed by the resistance 42 and the primary winding 50 since this series branch is in parallel with the resistance 46. The signal causes a current to flow through the resistance 42 and the winding 50, the current being in a direction to change the saturation of the core 62 from a positive polarity to a negative polarity.

While the flux in the core 62 is changing from a positive saturation to a negative saturation, it passes through the dynamic region 80. This causes a signal indicated at 110 in Figure 4 to be produced in the primary winding 50 and signals indicated at 112 and 114 to be respectively induced in the windings 54 and 56. The signals 110, 112 and 114 in Figure 4 appear on the lower terminals of the windings 50, 54 and 56 in Figure 1. This causes a positive signal indicated at 116 in Figure 4 to appear at the output terminal 58. The signals 110 and 114 are combined at the common terminal between the windings 50 and 56 to produce a signal having a peak amplitude approximately three times as great as that induced in the winding 56. Since this signal is relatively positive at the common terminal between the windings 50 and 56, a negative signal can be considered to be introduced to the output terminal 60. This signal is indicated at 118 in Figure 4.

When the core 62 becomes saturated with flux of a negative polarity upon the discharge of the capacitance 34, it inhibits the production of any overshoots in output voltage. This results from the inability of the core 62 to produce any flux when a moderate amount of positive ampere-turns are introduced to the core to bring the core into the region 88. In this way, a single pulse is produced upon each discharge of the capacitance 34. This pulse occurs approximately one half of a cycle after the pulse produced by the discharge of the capacitance 24. The pulse produced by the discharge of the capacitance 34 has an opposite polarity to that produced by the discharge of the capacitance 24.

By providing the push-pull arrangement described above, unique output signals are produced at the terminals 58 and 60. The signals at the output terminal 60 are illustrated on the fourth horizontal row of Figure 4 and the signals at the output terminal 58 are illustrated in the fifth horizontal row of Figure 4. As will be seen, the signals at each output terminal alternate between signals of positive and negative polarity. At the time that a signal of one polarity is produced on one output terminal, a signal of the opposite polarity is produced on the other output terminal. Furthermore, the signals of negative polarity have a different amplitude than the signals of positive polarity in a relationship dependent upon the turns ratios between the windings 50, 54 and 56.

The pulse generator described above has certain important advantages. It provides a single output pulse every time that one of the switches 12 and 14 is actuated. The generator provides each individual pulse without any appreciable overshoots in voltage. This is important in such fields as digital computers where overshoots may represent binary values. For example, the pulse generator may be used with the apparatus disclosed and claimed in copending application Serial No. 521,173, filed July 13, 1955, by me to control the sequential stepping of digital information upon the occurrence of successive pulses from the generator.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A pulse generator, including, a source of voltage, a capacitance, a unidirectional member, a switch operative in one position to form a circuit with the voltage source, the capacitance and the unidirectional member to produce a charging of the capacitance in a particular direction, load members connected in a circuit with the capacitance and the switch in a second position of the switch to produce a discharge of the capacitance through the load members, and a member having a saturable magnetic core and being connected to the load members to limit to a single pulse the output signals produced across the load members upon the discharge of the capacitance.

2. A pulse generator, including, a switch having first and second positions of closure, a capacitance, a unidirectional member, a source of voltage, the capacitance, the unidirectional member and the voltage source being connected in a circuit with the switch in the first position of switch closure to produce a charge of the capacitance, the unidirectional member and the switch being connected to prevent the discharge of the capacitance through the unidirectional member in the second position of the switch, an inductance and a resistance being connected in a circuit with the capacitance and the switch to produce a resonant discharge of the capacitance through the inductance and the resistance in the second position of the switch, and a magnetic member having a saturable core and connected to the resistance to produce effectively only a single output pulse upon the discharge of the capacitance through the inductance and the resistance.

3. A pulse generator, including, a capacitance, a voltage source, a unidirectional member, a switch connected in one position to obtain a flow of current from the voltage source through the unidirectional member and the capacitance to charge the capacitance, the unidirectional member being connected to prevent the flow of a charging current or the discharge of the capacitance through the unidirectional member in a second position of the switch, means including a load connected to the capacitance to provide for a discharge of the capacitance through the load in the second position of the switch, and a magnetic member including a core having rectangular hysteresis properties, the magnetic member being connected to the load to produce effectively only a single output pulse upon the discharge of the capacitance through the load.

4. A pulse generator, including, a magnetic member made from a saturable core to produce when saturated signals only upon the flow of current having a polarity opposite to that of the current previously producing saturation and having an amplitude greater than a particular value, a load connected to the magnetic member to apply a signal to the member for the production of core saturation upon the occurrence of the signal and for the retention of the saturation upon the occurrence of signal overshoots of less than the particular value, a capacitance, a source of voltage, and a switch connected in a circuit with the source of voltage and the capacitance in a first position of the switch to produce a charging of the capacitance and connected in a circuit with the capacitance and the load in a second position of the switch to produce a discharge of the capacitance through the load for the production of a signal across the load.

5. A pulse generator, including, a magnetic member including a core having properties of saturation and having properties for inhibiting upon saturation the passage of signals of less than a particular amplitude and for passing signals of amplitudes greater than the particular amplitude and of a polarity for changing the core saturation from one direction to the other, a capacitance, a voltage source, a switch having first and second positions of closure, means for actuating the switch from the first position of closure to the second position of closure at a particular frequency, the switch being connected in its first position of closure in a circuit with the voltage source and the capacitance for charging the capacitance, and a load connected in a circuit with the capacitance and the switch in the second position of the switch to receive a discharge of the capacitance for the production of a signal having an amplitude greater than the particular value upon each closure of the switch and of a polarity for changing the core saturation from one polarity to the other, the load including an inductance for producing with the capacitance a branch resonant at a frequency greater than the particular frequency.

6. A pulse generator, including, a first capacitance, a first unidirectional member, a voltage source, a first switch connected in a circuit with the capacitance, the unidirectional member and the voltage source in one position of the switch to produce a flow of charging current through the capacitance, a first load connected in a circuit with the capacitance and the switch in a second position of the switch to provide for a discharge of the capacitance through the load, a second capacitance, a second unidirectional member, a second switch, the last three mentioned members being connected to the voltage source to produce a charge of the second capacitance in one position of the second switch, a second load connected in a circuit with the second capacitance and the second switch in a second position of the switch to provide for a discharge of the capacitance through the load, means for providing for alternate movements of the first and second switches into their second positions, and a magnetic member connected to the first and second loads and having a saturable core to produce pulses of alternating polarity in accordance with successive movements of the first and second switches into their second positions and to produce effectively only a single pulse upon each of such switch movements.

7. A pulse generator, including, a voltage source, a pair of unidirectional members, a pair of capacitances, a pair of switches, the voltage source being connected in a circuit with one of the unidirectional members, capacitances and switches to produce a charge of the capacitance in one position of the switch and being connected in a circuit with the other unidirectional member, capacitance and switch to produce a charge of the capacitance in one position of the switch, a pair of loads including an inductance in each load connected in a circuit with a different one of the switches in the pair to produce a resonant discharge of the capacitance through the load in a second position of the switch, means for alternately obtaining a change of each of the switches in the pair from the first position of the switch to the second position of the switch, and a magnetic member having a saturable core and connected to the loads to produce a single pulse of one polarity upon each discharge through one of the loads and a single pulse of the opposite polarity upon each discharge through the other load.

8. A pulse generator, including, a switch having first and second positions, a voltage source, a capacitance, means including a unidirectional member connected in series with the switch, the voltage source and the capacitance to produce a charge of the capacitance in the first position of the switch and to prevent a discharge of the capacitance in the second position of the switch, a load connected in a series circuit with the capacitance and the switch in the second position of the switch to receive a discharge of the capacitance in the second position of the switch, a magnetic member including a core having rectangular hysteresis properties, and means including the magnetic member connected in a series circuit with the capacitance and the switch in the second position of the switch to receive the discharge of the capacitance for the saturation of the core in the magnetic member to obtain the production of only a single pulse across the load upon each such discharge.

9. A pulse generator, including, a first switch having first and second positions, a second switch having first and second positions, a voltage source, a first capacitance, a second capacitance, first unidirectional means, second unidirectional means, means for actuating the first and second switches on a sequential basis to obtain an operation of each switch in the first position at the same time as an operation of the other switch in the second position, means including the voltage source, the first switch, the first capacitance and the first unidirectional means connected in a first series circuit to obtain a charging of the capacitance in the first position of the switch and to prevent a discharge of the capacitance in the second position of the switch, means including the voltage source, the second switch, the second capacitance and the second unidirectional means connected in a second series circuit to obtain a charging of the capacitance in the first position of the switch and to prevent a discharge of the capacitance in the second position of the switch, a member having a core saturable with fluxes of first and second polarities and connected in a series circuit with the first capacitance and the first switch in the second position of the switch to produce a discharge of the capacitance for a saturation of the core with flux of the first polarity and connected in a series circuit with the second capacitance and the second switch in the second position of the switch to produce a discharge of the capacitance for the saturation of the core with flux of the second polarity, means including a first load connected in a series circuit with the first capacitance and the first switch in the second position of the switch to produce an output pulse across the load upon a discharge of the capacitance and until the saturation of the core with flux of the first polarity, and means including a second load connected in a series circuit with the second capacitance and the second switch in the second position of the switch to produce an output pulse across the load upon a discharge of the capacitance and until the saturation of the core with flux of the second polarity.

10. A pulse generator as set forth in claim 9 in which the first load includes a first inductance and a first resistance in series and in which the second load includes a second inductance and a second resistance in series and in which the saturable member is connected across the first and second resistances to obtain the production of only a single pulse across the resistances upon the discharge of the capacitances.

No references cited.